(12) United States Patent
Dale et al.

(10) Patent No.: US 11,484,764 B2
(45) Date of Patent: Nov. 1, 2022

(54) SHUFFLEBOARD SCORING SYSTEM

(71) Applicant: Electric Shuffle IP Limited, London (GB)

(72) Inventors: Jason Dale, Surrey (GB); Stephen Moore, Wimbledon (GB)

(73) Assignee: Electric Shuffle IP Limited, London (GB)

( * ) Notice: Subject to any disclaimer, the term of this patent is extended or adjusted under 35 U.S.C. 154(b) by 690 days.

(21) Appl. No.: 16/473,894

(22) PCT Filed: Oct. 19, 2017

(86) PCT No.: PCT/GB2017/053166
§ 371 (c)(1),
(2) Date: Jun. 26, 2019

(87) PCT Pub. No.: WO2018/127677
PCT Pub. Date: Jul. 12, 2018

(65) Prior Publication Data
US 2021/0129007 A1 May 6, 2021

(30) Foreign Application Priority Data
Jan. 5, 2017 (GB) ..................................... 1700151

(51) Int. Cl.
*A63B 67/14* (2006.01)
*A63B 71/06* (2006.01)
(Continued)

(52) U.S. Cl.
CPC ...... *A63B 71/0605* (2013.01); *A63B 24/0021* (2013.01); *A63B 67/14* (2013.01);
(Continued)

(58) Field of Classification Search
CPC . A63B 71/0605; A63B 71/0069; A63B 67/14; A63B 24/0021; A63B 2024/0028;
(Continued)

(56) References Cited

U.S. PATENT DOCUMENTS 5,171,013 A 12/1992 Dooley
2010/0113197 A1* 5/2010 Martin ............... A63B 24/0021
463/2
(Continued)

FOREIGN PATENT DOCUMENTS

GB 2558571 A * 7/2018 ......... A63B 24/0021

OTHER PUBLICATIONS

International Search Report cited in Application No. PCT/GB2017/053166, dated Dec. 20, 2017, pp. 1-14.

*Primary Examiner* — Raleigh W Chiu
(74) *Attorney, Agent, or Firm* — Cooper Legal Group, LLC

(57) ABSTRACT

A scoring system is disclosed for a shuffleboard table 2 having a sliding surface 4 on which a puck 6 can be thrown. A camera 26 is arranged to point in a direction 28 that is angled relative to the normal 30 of the sliding surface 4. A puck 6 can be thrown and a computer 32 can detect a moving object within a throwing zone 16. The computer 32 analyses whether the detected moving object corresponds to a valid puck. When all pucks are stationary on the sliding surface 4 the computer 32 can calculate a score.

20 Claims, 3 Drawing Sheets

(51) Int. Cl.
  *G06T 7/90* (2017.01)
  *G06T 7/70* (2017.01)
  *A63B 24/00* (2006.01)
  *G06T 7/20* (2017.01)

(52) U.S. Cl.
  CPC ............ *A63B 71/0669* (2013.01); *G06T 7/20* (2013.01); *G06T 7/70* (2017.01); *G06T 7/90* (2017.01); *A63B 2024/0028* (2013.01); *A63B 2220/05* (2013.01); *A63B 2220/806* (2013.01); *G06T 2207/10024* (2013.01); *G06T 2207/30224* (2013.01)

(58) Field of Classification Search
  CPC . A63B 2220/05; A63B 2220/806; G06T 7/20; G06T 7/70; G06T 7/90; G06T 2207/10024; G06T 2207/30224
  See application file for complete search history.

(56) References Cited

U.S. PATENT DOCUMENTS

2015/0146003 A1    5/2015  Seita
2016/0217325 A1\*  7/2016  Bose ...................... G11B 27/17
2016/0370155 A1\*  12/2016  Dale ........................ G06T 7/73

\* cited by examiner

SHUFFLEBOARD SCORING SYSTEM

The present invention relates to a scoring system for a shuffleboard.

The game of shuffleboard, or table shuffleboard, is traditionally played on a long wooden table. Each player throws one plastic-capped metal puck in turn from one end of the table down towards the opposite end of the table until all the pucks of an innings or frame have been thrown. The scores are usually determined at the end of each frame according to the rules of the game. Scoring is typically performed manually by a scorer visually inspecting the relative positions of each puck on the shuffleboard and using a scoreboard or digital scoring unit. Aside from being a chore for the scorer, this slows down gameplay because scoring relies on human judgement followed by the manual logging of scores.

Table shuffleboard is growing in popularity and can be increasingly found in public spaces, such as bars and entertainment complexes. However, such environments can become crowded and make it difficult to advance gameplay. This may be related to stray objects falling or being thrown onto a shuffleboard during play, or the time spent scoring a frame where scoring can be often performed by the players themselves.

Automatic scoring systems exist for shuffleboards. One example of such a system is described in CN203075589U. In this system a camera is arranged to point straight down at the scoring area of a shuffleboard table. In another example, found in CN2560399Y, a camera is arranged at each longitudinal end of a table, such that the game can be played in either direction. A control key is included in the system to operate the camera for scoring. These systems are vulnerable to interference, such as non-puck objects being thrown onto a shuffleboard, pucks being manually placed into scoring areas or a camera's field of view being obstructed by humans.

An object of the invention is to improve integrity in automatic shuffleboard scoring so that scores are recorded only for validly thrown pucks.

According to an aspect of the invention there is provided a shuffleboard scoring system comprising: a shuffleboard having a sliding surface on which pucks can slide; a camera arranged to point at the sliding surface of the shuffleboard; and at least one processor configured to: receive image data from the camera; detect in the image data a moving puck on the sliding surface at a first time having predetermined moving characteristics; detect in the image data a substantially stationary arrangement at a second time, which is later than the first time; determine that a puck has been validly thrown if a moving puck is detected at the first time and the substantially stationary arrangement is detected at the second time; and calculate a score based on the position of one or more pucks relative to the sliding surface at the second time.

In this way, it is possible to verify a valid throw by detecting a first moving puck, followed by a substantially stationary arrangement at a second time. This can trigger calculation of a score to ensure that scores are calculated only for validly thrown pucks. The substantially stationary arrangement at a second time may include one or more pucks relative to the sliding surface. In some cases the substantially stationary arrangement at a second time may also include no pucks on the sliding surface or within the camera's field of view. For example, this may be due to a validly thrown puck being thrown off a shuffleboard table or a person removing a validly thrown puck from the camera's field of view after the puck has fallen off the sliding surface into a well surrounding the sliding surface. In addition, it is possible to disregard any unwanted movement that is within the camera's field of view. The processor will only detect a puck that has predetermined moving characteristics. This advantageously improves tile integrity of the automatic scoring system. In particular, this can prevent a player from falsifying a score by manually placing pucks directly onto the surface of the shuffleboard, throwing invalid objects onto the shuffleboard, or moving pucks that have already been thrown. A score would not be calculated for these pucks because they would lack a moving phase with the characteristics of a validly thrown puck.

Preferably the camera of the shuffleboard scoring system includes one or more colour filters matched to one or more colours of pucks.

In this way, it is possible to filter and omit irrelevant image data, thus reducing the amount of image data for the processor to handle. Typically, pucks have a coloured cap that associates each puck with a particular player/team. For example, pucks are coloured blue or red (each colour representing a player) so that they contrast with each other and with the colours of the shuffleboard, and can be easily detected against that background.

The predetermined moving characteristics may include a first moving puck having an expected colour based on gameplay rules.

In this way, it is possible to verify a valid throw and ensure that scores are calculated only for validly thrown pucks. This also advantageously improves the integrity of a turn-based system and advances gameplay. Typically, gameplay advances as one puck per player/team is thrown each turn until a set number of pucks have been thrown, such that the colour sequence of validly thrown pucks is, for example, red-blue-red-blue. If a same colour is thrown consecutively (for example red-red) then the processor may register an error and prompt for further user instruction. Gameplay rules may be changed so that different colour sequences are allowed.

Preferably the direction in which the camera is arranged to point is angled from the normal of the sliding surface.

In this way, the field of view of the camera may extend up the sliding surface of the shuffleboard from the scoring end of the table toward the throwing position. The camera's field of view is preferably where the predetermined moving characteristics of a moving puck can be detected, validated and scored by the processor. A validly thrown puck may have a range of possible movements, which depend on throwing style, as the puck is released from a user's hand, creates a visual disturbance upon entering the camera's field of view, and settles into a substantially stationary position within the camera's field of view.

The predetermined moving characteristics of a puck may include different shape characteristics for the puck at different positions on the sliding surface.

In this way, it is possible to reliably identify pucks and eliminate objects which are not pucks, i.e. non-pucks. The processor may readily identify and define a position of a validly thrown puck within the camera's field of view. Typically, a top view of a puck will be circular in shape, but will appear oval from the perspective of the angled camera. A puck will appear to change shape in the camera's field of view as it is thrown and moves along the sliding surface, where the degree of non-circularity usually decreases as the puck moves closer to the camera.

This technique can reduce the risk of spoofing based on external factors. In one example a player has a watch which has a similar size, shape and colour to that expected for a puck. The different shape characteristics predetermined for a puck will allow the processor to disregard the player's watch as a non-puck; the watch would be very unlikely to exhibit the predetermined changes in shape expected for a puck as it would rot be moving on the same plane or axis, on the sliding surface, as a puck.

Preferably the predetermined moving characteristics include the first moving puck being positioned between a scoring end of the sliding surface and a trigger line, which is spaced away from a throwing end of the sliding surface.

In this way, the processor can disregard any object or unwanted movement within the camera's field of view that is not beyond a positional trigger. For example, the positional trigger may be an entry zone or start line that a puck must pass through before being determined as validly thrown. The trigger line may be positioned beyond the normal reach of a user from the throwing end of the sliding surface. For example, it may be around 1 to 2 metres from the throwing end.

The camera of shuffleboard scoring system captures images with a frequency that is high enough to detect movement of a validly thrown puck. In this way, the processor may validate the predetermined characteristics of a first moving puck and any previously validly thrown pucks match expected properties. This can improve integrity in scoring because it would be difficult or impossible for a user to mimic the properties of a moving puck, followed by a stationary puck. Typically, a video feed of the camera's field of view is created, where the presence of a first moving puck can be inferred from a sequence of still images. The moving phase of the detected first moving puck may include successive images which exhibit differences. The substantially stationary arrangement of the puck that follows the moving phase can also be inferred in this way. The stationary phase of the puck may follow the moving phase and include successive images which are substantially identical. Inference may also be applied to any previously validly thrown pucks present within the camera's field of view that may move as a result of any of the validly thrown pucks striking each other. The processor may compare still images during the course of play to ensure that all validly thrown pucks within the camera's field of view have become substantially stationary before advancing gameplay.

The comparison of still images may also establish cheat resistance. If an invalid puck is identified then the method/system may involve obtaining an image of the shuffleboard in its last state of substantially stationary valid pucks, determining if the image matches an expected image of a valid puck entering the active region, and advancing gameplay in accordance with rules. If the predetermined characteristics do not correspond to a valid puck then the camera can await an image of a clear shuffleboard, or a shuffleboard in its last state of substantially stationary valid pucks.

The camera's field of view may be divided into zones of different scores.

In this way, the processor may calculate the scores of each player/team based on the positions of zero, one or more pucks relative to the sliding surface. The scores may be calculated in real-time as a first moving puck moves down the sliding surface and potentially collides with any previously validly thrown pucks. Typically, any validly thrown pucks are scored after they settle into substantially stationary positions. This may also include a no-score zone where a validly thrown puck falls off the sliding surface of the shuffleboard into a gutter region that is located around the periphery of the sliding surface.

The shuffleboard scoring system may include a Graphic User Interface, GUI.

In this way, the GUI may display player scores at the end of a turn based on the substantially stationary arrangement at a second time. Real-time calculating of scores may also be displayed as any validly thrown pucks move between different scoring zones. Once the substantially stationary arrangement is detected at a second time, a player's turn is ended and the processor may advance gameplay to a next player.

The display may present the camera's field of view and highlight all of the present validly thrown pucks. This may allow a user to verify that the processor has correctly detected all present validly thrown pucks.

According to another aspect of the invention there is provided an automatic method performed by at least one processor of scoring a game of shuffleboard, comprising the steps of: receiving image data; detecting in the image data a moving puck on the sliding surface at a first time having predetermined moving characteristics; detecting in the image data a substantially stationary arrangement at a second time, which is later than the first time; determining that a puck has been validly thrown if a moving puck is detected at the first time and the substantially stationary arrangement is detected at the second time; and calculating a score based on the position of one or more pucks relative to the sliding surface at the second time.

According to yet another aspect of tile invention there is provided a computer product comprising executable instructions stored thereon which when executed by a computer cause the computer to perform steps, including: receiving image data; detecting in the image data a moving puck on the sliding surface at a first time having predetermined moving characteristics; detecting in the image data a substantially stationary arrangement at a second time, which is later than the first time; determining that a puck has been validly thrown it a moving puck is detected at the first time and the substantially stationary arrangement is detected at the second time; and calculating a score based on the position of one or more pucks relative to the sliding surface at the second time.

Apparatus features may be provided as method features and vice-versa.

Embodiments of the invention are now described, by way of example, with reference to the drawings, in which.

Figure 1:
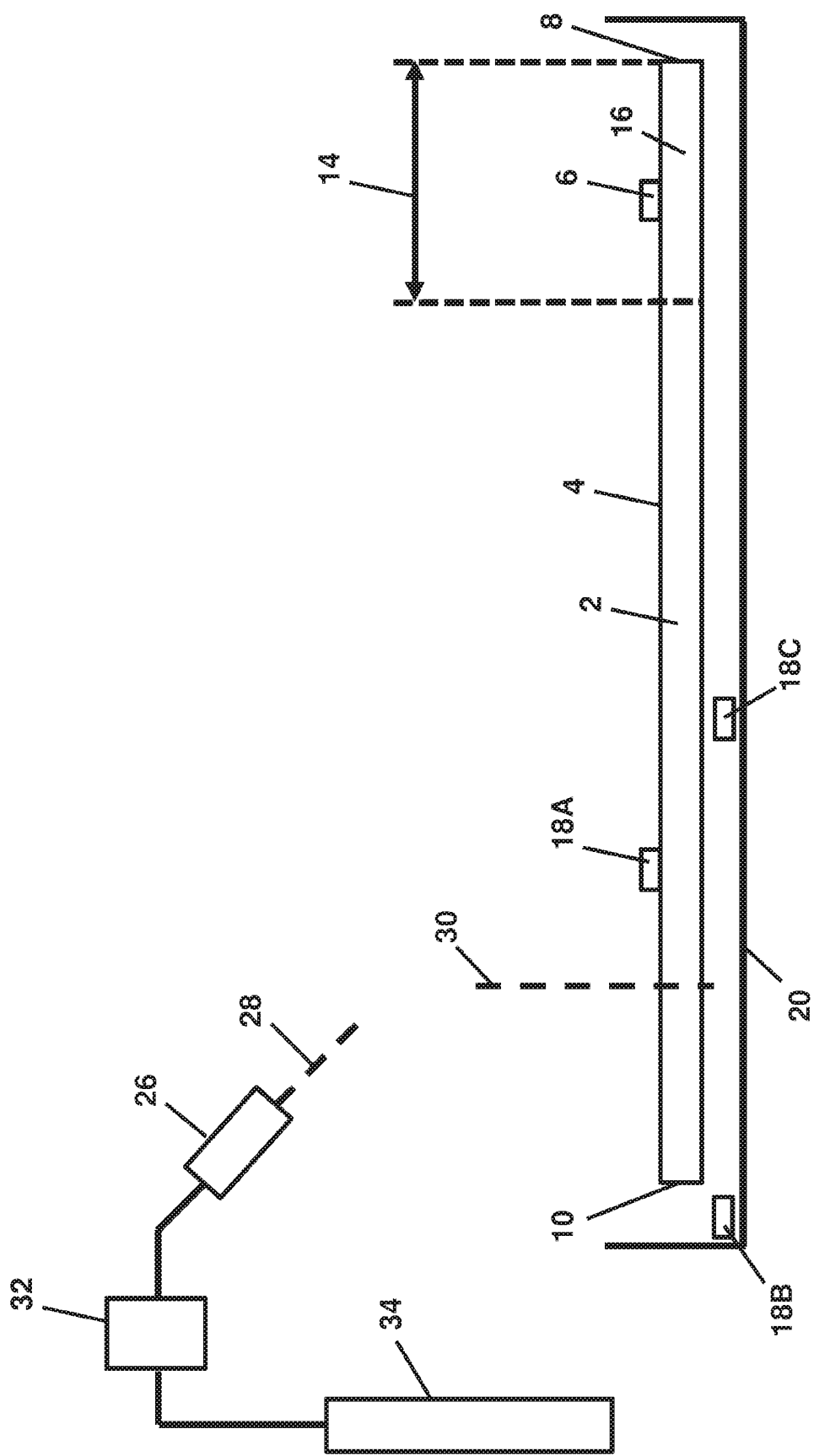
FIG. 1 is a front view of a shuffleboard scoring system in an embodiment of the present invention.
Figure 2:
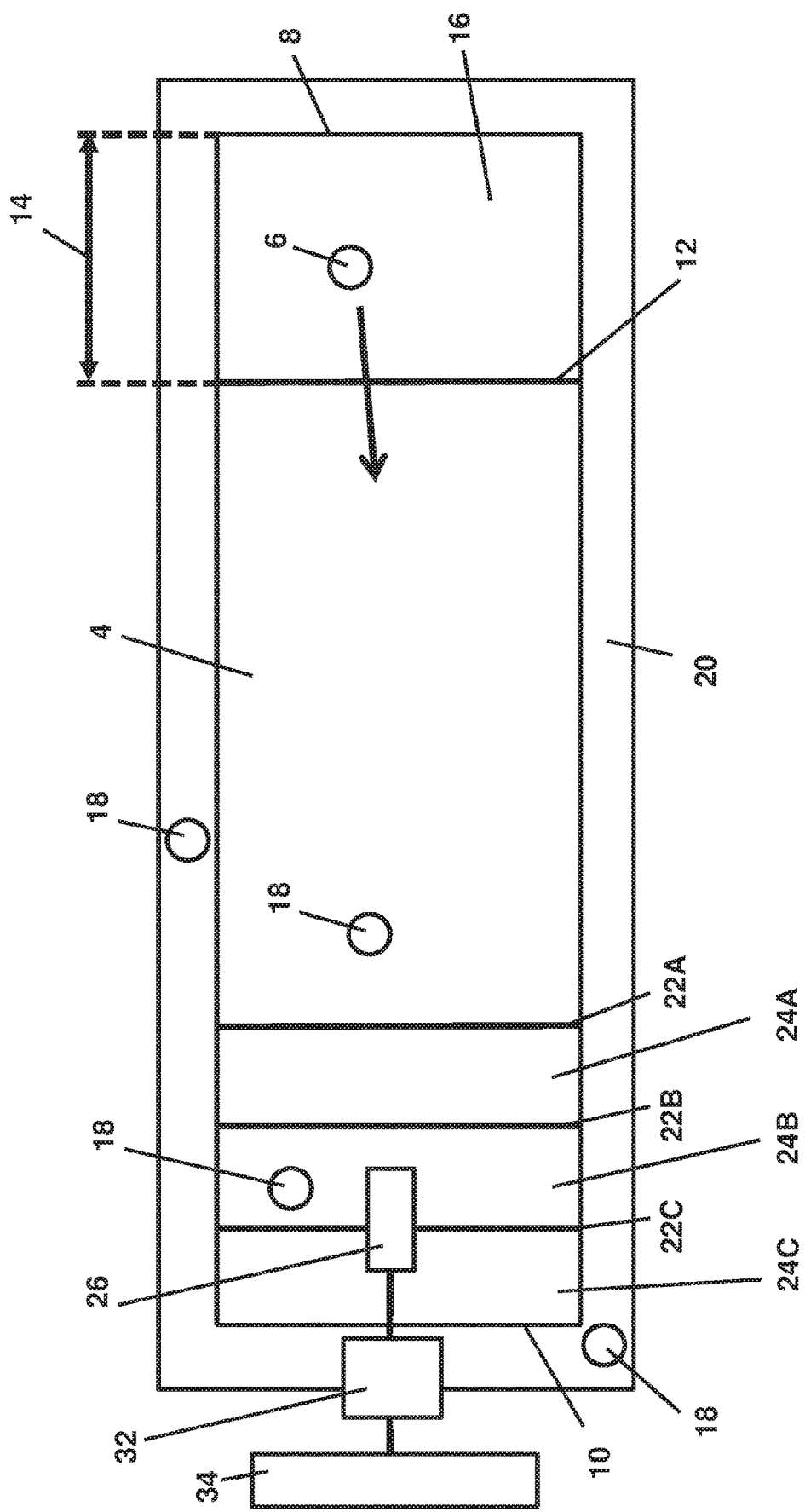
FIG. 2 is a top view of the shuffleboard scoring system shown in FIG. 1.

As shown in FIGS. 1 and 2, a shuffleboard table 2 has a sliding surface 4 on which a puck 6 can be thrown. The shuffleboard table 2 has a throwing end 8 and a scoring end 10. A trigger line 12 may be provided at a predetermined length 14 away from the throwing end 8 to define the limit of a throwing zone 16. One or more previously validly thrown pucks 18A may be positioned on the sliding surface 4 beyond the trigger line 12. One or more previously validly thrown pucks 18B-18C can also be positioned in a well 20 that surrounds the sliding surface 4. Previously validly thrown puck 18B has fallen off the sliding surface 4 at the scoring end 10, and previously validly thrown puck 18C has fallen off the side of the sliding surface 4. Three lines 22A-220 are provided to define three different scoring sections 24A-24C, Alternative use of one or more lines to define scoring sections or zones would readily occur to a person skilled in the art for use in shuffleboard games involving one or more scoring zones. For example, a game may only have one line to define a single scoring zone. The one or more lines are also not restricted to being straight and can be curved or used to form different shapes.

A camera 26 is arranged to point in a direction 28 that is angled from the normal 30 of the sliding surface 4. A computer 32 including one or more processors is connected to the camera 26 for analysing image data. In addition a Graphic User Interface 34 is connected to the computer 32 for displaying scores to players.

Figure 3:
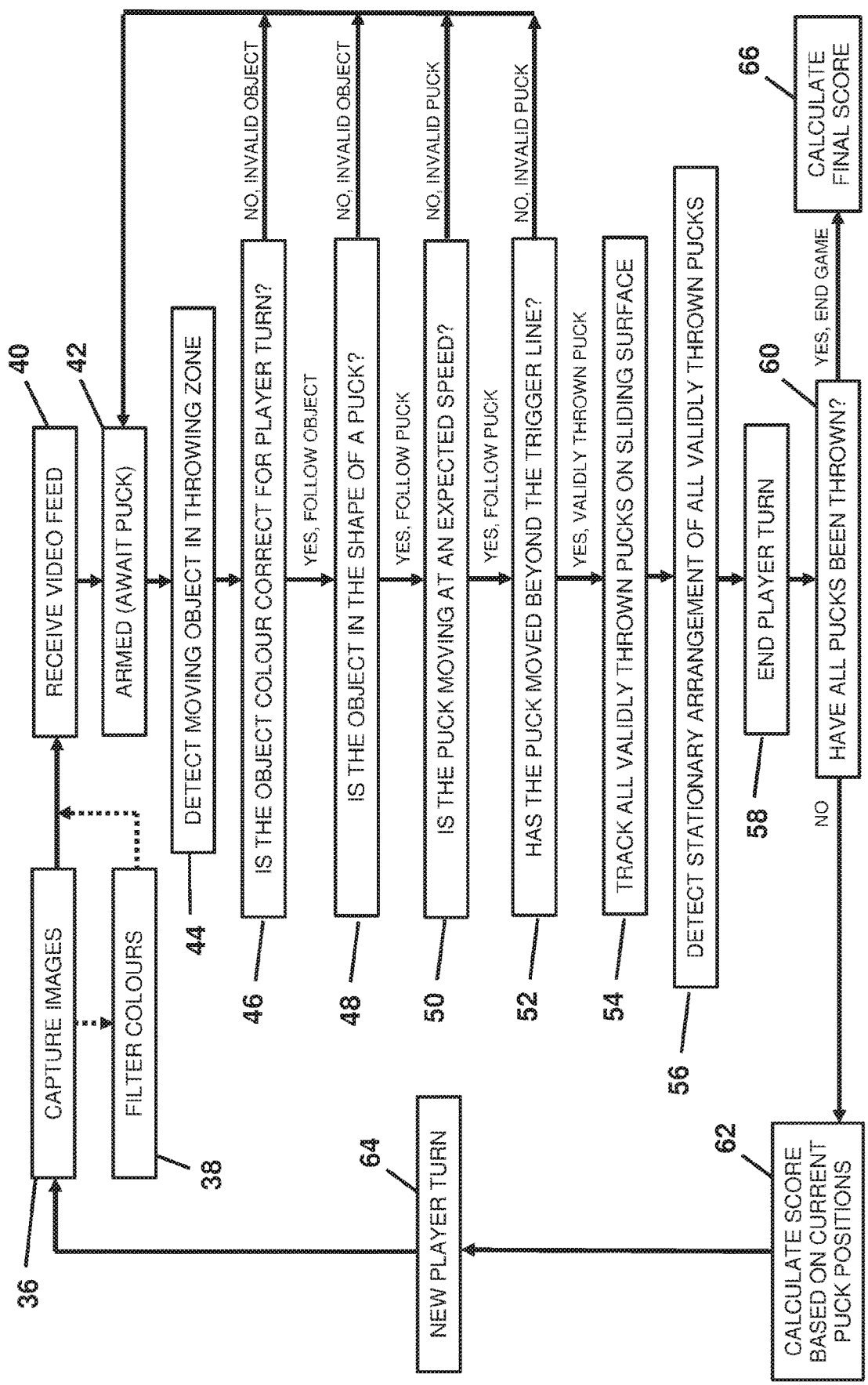
FIG. 3 is a flow diagram showing steps taken in a method of automatically shuffleboard scoring, in an embodiment of the invention.

FIG. 3 is a flow diagram showing a sequence of steps undertaken in a shuffleboard scoring system. At step 36 the camera 26 surveys the scene. The camera 26 captures images at a set frequency that allows predetermined moving characteristics of a puck to be validated. Step 38 may be included where one or more colour filters omit irrelevant colours from the images captured by the camera 26. At step 40 images from the camera 26 are sent to the computer 32, which awaits a sliding surface 4 clear of pucks or a sliding surface 4 with any previously validly thrown pucks 18 in a substantially stationary arrangement beyond the trigger line 12. When a clear sliding surface 4, or a sliding surface 4 with stationary previously validly thrown pucks 18, is detected the flow chart moves to step 42 at which the system is armed and waiting for a puck 6 to be thrown.

At step 44 the computer 32 detects a moving object within the throwing zone 16. A moving object phase begins when a minimum pixel difference is detected between successive images of the sliding surface 4 at step 44.

At steps 46, 48, and 50 the computer 32 analyses whether the detected moving object corresponds to a valid puck. Predetermined moving characteristics of a valid puck include an expected colour of a puck to be next thrown in the order of gameplay, which is analysed at step 46. For example, in a game where the colour sequence for pucks to be thrown is: red-blue-red-blue, the computer 32 will expect a blue-coloured puck to be thrown in the second and fourth turns, that would follow validly thrown red-coloured pucks in the first and third turns respectively. The expected colour of a puck depends on gameplay rules and may be altered such that the same colour is thrown consecutively for a set number of turns. For example, a colour sequence for pucks to be thrown may be: blue-blue-red-red.

The predetermined moving characteristics also include an expected shape for a puck at a particular position on the sliding surface 4, which is analysed at step 48. For example, pucks used in a shuffleboard game typically have a circular cross section; from the perspective of the camera 26, pucks will appear oval and a puck toward the throwing end 8 will have a shorter width dimension than a puck closer to the scoring end 10. The computer 32 may determine the position of a puck based on its degree of non-circularity or length and width dimensions.

The predetermined moving characteristics also include an expected speed for a puck on the sliding surface 4, which is analysed at step 50. For example, objects that move too fast or too slow may be considered not a part of gameplay.

After a moving object that has been identified as a valid puck, the computer at step 52 analyses whether the valid puck is validly thrown on the sliding surface 4 at a first time. This is achieved by detecting a puck 6 that has been thrown from the throwing zone 16 and passes the trigger line 12 towards the scoring end 10; a puck 6 is considered validly thrown if this happens, regardless of the final position of the puck 6. The final position of the puck 6 may be on the sliding surface 4, within the surrounding well 20, or possibly be out of the field of view of the camera 26.

At step 54 the computer 30 analyses all validly thrown pucks present on the sliding surface 4. A puck 6 that is validly thrown may collide with the one or more previously validly thrown pucks 18 on the sliding surface 4. This collision may cause the puck 6 to change its trajectory and the one or more previously validly thrown pucks 18 to consequentially move. The one or more previously validly thrown pucks 18 may also further collide with each other causing a shift in positions across the sliding surface 4. Collisions between any of the validly thrown pucks on the sliding surface 4 may also result in one or more pucks falling off the sliding surface 4 into the well 20.

At step 56 the computer 30 detects a second time when all validly thrown pucks within the camera's field of view reach a substantially stationary arrangement. This can be when the computer 32 cannot detect a minimum pixel difference between successive images from the camera 26. It may take some time for all of the moving pucks to become precisely stationary and the computer 32 may be set to tolerate a predetermined pixel difference within a time period in order to advance gameplay. For example, a puck may be spinning on a position on the sliding surface 4 and exhibit some wavering that is detected by the computer 32; the computer 32 may determine that the puck is substantially stationary when the puck's position on the sliding surface 4 does not change within a predetermined time period, such as one or two seconds. When a substantially stationary arrangement of all validly thrown pucks is reached, a player's turn comes to an end and defined at step 58.

At step 60 the computer determines whether a predetermined number of pucks have been validly thrown by each player. If the predetermined number has not been reached, the scores are calculated at step 62 based on the current positions of all validly thrown pucks on the sliding surface 4 and a new player's turn begins at step 64. If all the predetermined number of pucks have been validly thrown, the frame or game ends at step 66 where a final score is calculated.

The calculated scores at steps 64 and 66 may be displayed on the Graphic User Interface 34.

The method described above is appropriate for use in connection with the standard shuffleboard game. Alternative methods would readily occur to a person skilled in the art for use in shuffleboard games.

The invention claimed is:

1. A shuffleboard scoring system comprising:
   a shuffleboard having a sliding surface on which pucks can slide;
   a camera arranged to point at the sliding surface of the shuffleboard; and
   at least one processor configured to:
   receive image data from the camera;
   detect in the image data a moving puck on the sliding surface at a first time having predetermined moving characteristics;
   detect in the image data a substantially stationary arrangement at a second time, which is later than the first time;
   determine that a puck has been validly thrown when the moving puck is detected at the first time and the substantially stationary arrangement is detected at the second time; and
   calculate a score based on a position of one or more pucks relative to the sliding surface, wherein the camera comprises one or more colour filters matched to one or more colours of pucks and wherein the predetermined moving characteristics include a first moving puck having an expected colour based on gameplay rules.

2. The shuffleboard scoring system of claim 1, wherein a direction in which the camera is arranged to point is angled from the normal of the sliding surface.

3. The shuffleboard scoring system of claim 2, wherein the predetermined moving characteristics of a puck include different shape characteristics for the puck at different positions on the sliding surface.

4. The shuffleboard scoring system of claim 3, wherein the predetermined moving characteristics include a first moving puck being positioned between a scoring end of the sliding surface and a trigger line, which is spaced away from a throwing end of the sliding surface.

5. The shuffleboard scoring system of claim 3, wherein a field of view of the camera is divided into zones of different scores.

6. The shuffleboard scoring system of claim 2, wherein the predetermined moving characteristics include a first moving puck being positioned between a scoring end of the sliding surface and a trigger line, which is spaced away from a throwing end of the sliding surface.

7. The shuffleboard scoring system of claim 2, wherein a field of view of the camera is divided into zones of different scores.

8. The shuffleboard scoring system of claim 1, wherein the predetermined moving characteristics include the first moving puck being positioned between a scoring end of the sliding surface and a trigger line, which is spaced away from a throwing end of the sliding surface.

9. The shuffleboard scoring system of claim 1, wherein a field of view of the camera is divided into zones of different scores.

10. The shuffleboard scoring system of claim 1, wherein the shuffleboard scoring system includes a Graphic User Interface (GUI).

11. An automatic method performed by at least one processor of scoring a game of shuffleboard, comprising the steps of:
    receiving image data from a camera arranged to point at a sliding surface of a shuffleboard, wherein the camera comprises one or more colour filters matched to one or more colours of pucks;
    detecting in the image data a moving puck on the sliding surface of the shuffleboard at a first time having predetermined moving characteristics, wherein the predetermined moving characteristics include the moving puck having an expected colour based on gameplay rules;
    detecting in the image data a substantially stationary arrangement at a second time, which is later than the first time;
    determining that a puck has been validly thrown when the moving puck is detected at the first time and the substantially stationary arrangement is detected at the second time; and
    calculating a score based on a position of one or more pucks relative to the sliding surface at the second time.

12. The automatic method of claim 11, wherein a direction in which the camera is arranged to point is angled from the normal of the sliding surface.

13. The automatic method of claim 12, wherein the predetermined moving characteristics include different shape characteristics for the puck at different positions on the sliding surface.

14. The automatic method of claim 11, wherein the predetermined moving characteristics include the moving puck being positioned between a scoring end of the sliding surface and a trigger line, which is spaced away from a throwing end of the sliding surface.

15. The automatic method of claim 11, wherein a field of view of the camera is divided into zones of different scores.

16. A computer product comprising executable instructions stored thereon which when executed by a computer cause the computer to perform steps, including:
    receiving image data from a camera arranged to point at a sliding surface of a shuffleboard, wherein the camera comprises one or more colour filters matched to one or more colours of pucks;
    detecting in the image data a moving puck on the sliding surface of the shuffleboard at a first time having predetermined moving characteristics, wherein the predetermined moving characteristics include the moving puck having an expected colour based on gameplay rules;
    detecting in the image data a substantially stationary arrangement at a second time, which is later than the first time;
    determining that a puck has been validly thrown when the moving puck is detected at the first time and the substantially stationary arrangement is detected at the second time; and
    calculating a score based on a position of one or more pucks relative to the sliding surface at the second time.

17. The computer product of claim 16, wherein a direction in which the camera is arranged to point is angled from the normal of the sliding surface.

18. The computer product of claim 16, wherein the predetermined moving characteristics include different shape characteristics for the puck at different positions on the sliding surface.

19. The computer product of claim 16, wherein the predetermined moving characteristics include the moving puck being positioned between a scoring end of the sliding surface and a trigger line, which is spaced away from a throwing end of the sliding surface.

20. The computer product of claim 16, wherein a field of view of the camera is divided into zones of different scores.

* * * * *